2,743,208
DRY FREE-FLOWING IODINE COMPOSITIONS

James E. Marcuse, New York, N. Y., and Martin M. Reynolds, Old Greenwich, Conn., assignors to West Disinfecting Company, Long Island City, N. Y., a corporation of New York No Drawing. Application March 6, 1951,
Serial No. 214,202

8 Claims. (Cl. 167—17)

This invention relates to a dry, free-flowing iodine containing composition which is readily soluble in water and which when added to water results in a solution having germicidal properties.

Iodine, as is well known, is sparingly soluble in water. Satisfactory germicidal solutions cannot be produced by simply adding iodine to water. Various attempts have been made to produce iodine preparations which, when added to water, promptly result in iodine solutions of appreciable concentration, e. g., 1 part of iodine per 1000 parts of water. All such attempts prior to this invention, to the best of our knowledge and belief, have been unsuccessful for one reason or another. For example, iodine containing compositions have been prepared which are hygroscopic and for this reason are difficult to store, or in storage tend to cake. Liquid solutions have been produced which must be stored in bottles with consequent danger of breakage in handling and transportation.

It is an object of this invention to provide a dry, substantially non-hygroscopic, free-flowing iodine containing composition which is readily soluble in water and when added to water results in a solution in which the iodine is germicidally active, i. e., results in an antiseptic solution.

Other objects and advantages of this invention will be apparent from the following detailed description thereof.

In accordance with this invention a dry, free-flowing composition is prepared by mixing urea, iodine and an ethylene oxide condensate in which iodine is soluble or which condensate reacts with the iodine to form a compound or complex which readily liberates iodine in aqueous media. In the interest of simplicity the expression "condensate in which iodine is soluble" will be used hereinafter to include condensates which react with iodine to form a compound or complex which liberates iodine in an aqueous medium.

Desirably, the constituents are mixed in the proportion of from 50 to 80 parts, preferably from 60 to 70 parts of urea from 3 to 10 parts, preferably about 5 parts of iodine and from 10 to 47 parts, preferably about 25 to 35 parts, of the ethylene oxide condensate. In this specification all parts and percentages are by weight.

As the ethylene oxide condensate it is preferred to use such condensate of the aryl type and more particularly an ethylene oxide alkyl phenol condensate in which the alkyl group has from 8 to 32 carbon atoms condensed with from 5 to 60, preferably from 5 to 30, mols of ethylene oxide per mol of alkyl phenol. The preferred condensate is the nonyl phenol ethylene oxide condensate containing about 30 mols of ethylene oxide per mol of nonyl phenol. This condensate is sold under the trade name "Antarox A-404" by General Dyestuffs Corp. Instead of Antarox A-404 the polyoxypropylene glycol ethylene oxide condensate sold under the trade name "Pluronic F-68" by Wyandotte Chemicals Corporation may be employed. Pluronic F-68 is a condensate of polyoxypropylene glycol and ethylene oxide in the form of flakes, the polyoxypropylene glycol group having a molecular weight within the range of 1501 to 1800 and the condensate containing from 80 to 90 per cent by weight of ethylene oxide.

The urea may be the urea of commerce in finely divided form desirably having an average particle size of from 10 to 200 microns.

The constituents are mixed at room temperature, the iodine being added to the ethylene oxide condensate in the desired proportions within the range hereinabove indicated. The iodine dissolves in the ethylene oxide condensate producing a pasty mass.

Upon addition of the urea and mixing a dry, free-flowing product results, which is readily soluble in water at temperatures of from 5° to 50° C., producing an aqueous solution in which the iodine is in solution in germicidally active form. A solution having a concentration of iodine as high as 30 parts of iodine per 100 parts of water may be produced, if desired, by employing a urea, ethylene oxide aryl condensate and iodine mixture containing a relatively high concentration of iodine and adding this mixture to water in proportions to give the desired concentration of iodine in the resulting solution. For most practical purposes and particularly for the preparation of antiseptic solutions, a solution containing 1 part of iodine per 1000 parts of water is satisfactory.

Surprisingly it has been found that the urea and the condensate exert a synergistic effect in that they cooperate in promoting the ready solubility of the iodine in water at temperatures of from 5° to 50° C. In the case of relatively dilute concentrations of iodine with respect to the amount of condensate present in the mixture, i. e., when the amount of iodine is below 10% of the condensate, the condensate readily dissolves the iodine to produce a preparation which is soluble in water to form an iodine solution. In such mixtures the urea functions as a diluent and improves the solubility of the mixture in water at temperatures of from 5° to 50° C. At concentrations above 10%, particularly 12%, of iodine based on the weight of condensate the urea functions as a carrier for the iodine enabling the production of a dry, free-flowing product which readily dissolves in water at temperatures of from 5° to 50° C. to produce an iodine solution having germicidal properties.

The following example is given for purposes of illustration only; it will be understood this invention is not limited to this example.

| | Percent |
|---|---|
| Urea | 65 |
| Iodine | 5 |
| Nonyl phenol ethylene oxide condensate (Antarox A-404) | 30 |

The resultant mixture is dry and free flowing. It does not cake in storage and retains its dry, free-flowing characteristics. Upon addition to water at temperatures of from 5° to 50° C. the preparation dissolves quickly and readily forming a solution in which the iodine is germicidally active. Depending upon the relative amounts of water and the iodine containing composition added thereto, an iodine solution of any desired concentration up to about 30% may be produced.

It will be understood the reference to the iodine dissolving in the ethylene oxide aryl condensate is used in a broad sense and includes the formation of solid solutions and/or complexes of iodine and such condensates.

As many changes could be made in the above composition, and many apparently widely different embodiments of this invention could be made without departing from the scope of the claims, it is intended that all matter contained in the above description shall be interpreted as illustrative and not in a limiting sense.

Having thus described our invention what we claim as new and desire to secure by Letters Patent of the United States is:

1. A dry, free-flowing composition readily soluble in water at temperatures of from 5° to 50° C. which contains as its essential constituents from 60 to 70 parts urea, from 3 to 10 parts of free iodine and from 25 to 35 parts of an ethylene oxide alkyl phenol condensate the alkyl group of which contains from 8 to 32 carbon atoms and which contains from 5 to 60 mols of ethylene oxide per mol of alkyl phenol.

2. The dry, free-flowing composition as defined in claim 1, in which the ethylene oxide alkyl phenold condensate contains from 5 to 30 mols of ethylene oxide per mol of alkyl phenol.

3. A dry, free-flowing composition readily soluble in water at temperatures of from 5° to 50° C. which contains as its essential constituents from 60 to 70 parts urea, from 3 to 10 parts of free iodine and from 25 to 35 parts of an ethylene oxide nonyl phenol condensate containing from 5 to 60 mols of ethylene oxide per mol of nonyl phenol.

4. The dry, free-flowing composition as defined in claim 3, in which the ethylene oxide nonyl phenol condensate contains from 5 to 30 mols of ethylene oxide per mol of nonyl phenol.

5. The dry, free-flowing composition as defined in claim 3, in which the ethylene oxide nonyl phenol condensate contains about 30 mols of ethylene oxide per mol of nonyl phenol.

6. The dry, free-flowing composition which is readily soluble in water at temperatures of from 5° to 50° C. which contains about 65% urea and about 5% of free iodine and about 30% of a nonyl phenol ethylene oxide condensate containing about 30 mols of ethylene oxide per mol of nonyl phenol.

7. A dry, free-flowing composition readily soluble in water at temperatures of from 5° to 50° C., which contains as its essential constituents from 50 to 80 parts of urea, from 3 to 10 parts of free iodine and from 10 to 47 parts of an ethylene oxide condensate from the group consisting of ethylene oxide alkyl phenol condensates, the alkyl group of which contains from 8 to 32 carbon atoms and which contains from 5 to 60 mols of ethylene oxide per mol of alkyl phenol and polyoxypropylene glycol ethylene oxide condensates, the polyoxypropylene glycol group of which has a molecular weight within the range of 1501 to 1800 and containing from 80 to 90 per cent by weight of ethylene oxide.

8. A dry, free-flowing composition readily soluble in water at temperatures of from 5° to 50° C. which contains as its essential constituents from 50 to 80 parts of urea, from 3 to 10 parts of free iodine and from 25 to 35 parts of a polyoxypropylene glycol ethylene oxide condensate, the polyoxypropylene glycol group of which has a molecular weight within the range of 1501 to 1800 and containing from 80 to 90 per cent by weight of ethylene oxide.

References Cited in the file of this patent

UNITED STATES PATENTS

| | | |
|---|---|---|
| 1,970,578 | Schoeller et al. | Aug. 21, 1934 |
| 2,211,837 | Rice et al. | Aug. 20, 1940 |
| 2,556,820 | Nease | June 12, 1951 |
| 2,559,584 | Barker | July 10, 1951 |
| 2,665,256 | Barker | Jan. 5, 1954 |

FOREIGN PATENTS

| | | |
|---|---|---|
| 482,367 | Great Britain | Mar. 29, 1938 |

OTHER REFERENCES

Chem. & Engineering News, Feb. 19, 1951, pg. 664. (Copy in Patent Office Library.)

The Lancet, July 14, 1945, pgs. 42–44, "Clinical Trial of UFI."